Patented Jan. 17, 1928.

1,656,844

UNITED STATES PATENT OFFICE.

FRITZ STRAUB, GUILLAUME DE MONTMOLLIN, JOSEPH SPIELER, AND CHRISTOPH VON PLANTA, OF BASEL, SWITZERLAND, ASSIGNORS TO SOCIETY OF CHEMICAL INDUSTRY IN BASLE, OF BASEL, SWITZERLAND.

DYESTUFFS CONTAINING CHROMIUM AND PROCESS OF MAKING SAME.

No Drawing. Application filed June 1, 1925, Serial No. 34,199, and in Switzerland June 17, 1924.

The invention relates to the manufacture of new dyestuffs containing chromium and the process of making same, as well as to the material dyed with the new dyestuffs.

It has been found that valuable new dyestuffs may be obtained by treating with agents yielding chromium, as for instance chromium oxide or a hydrate or salt thereof, ortho-hydroxy azodyestuffs corresponding with the general formula

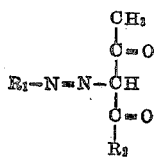

wherein $R_1$ stands for any aromatic nucleus carrying besides at least one nitrogroup one OH-group in ortho position to the azobridge, $R_2$ meaning O-alkyl or NH-aryl. The new products, which are the chromium derivatives of the above specified dyestuffs form, in a dry state, greenish-yellow to brownish-red and orange powders, dissolving in water to yellow, orange and brown solutions, dyeing wool in an acid bath from yellow to orange and brown tints of excellent properties of fastness. In some cases, there are also obtained dyestuffs which may successfully be employed for other purposes, as for instance chrome printing.

Example 1.

29.5 parts of the azo-dyestuff made from 4-nitro-2-amino-1-phenol and aceto-acetic acid ethylester corresponding probably with the formula:

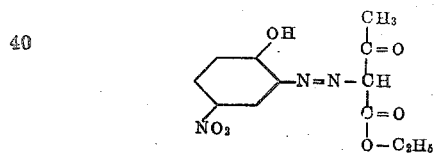

are suspended in 900 parts of water and there is added a quantity of chromium formate corresponding with 22.5 parts of $Cr_2O_3$, and the whole is boiled for a long time in a reflux apparatus. After cooling, dilute caustic soda solution is added until the liquid has a caustic alkali reaction. The mixture is stirred for some time and filtered; from the filtrate the dyestuff containing chromium is salted out. It is a yellow brown powder, soluble in water to a yellow solution and in dilute caustic soda solution to an orange solution. It dyes wool in a sulfuric acid bath very uniform, fast reddish yellow tints.

Example 2.

An aqueous solution containing 44.4 parts of the sodium salt of the dyestuff from 4-nitro-2-amino-1-phenol-6-sulfonic acid and aceto-acetic acid ethylester and chromium formate, corresponding with 22.5 parts of $Cr_2O_3$, is boiled for a long time in a reflux apparatus. The liquid is then in part evaporated and the dyestuff containing chromium is isolated by salting out. It is an olive brown powder, soluble in water to a yellow solution and in dilute caustic soda solution to an orange solution. It dyes wool in a sulfuric acid bath very uniform reddish-yellow tints of remarkable properties of fastness.

By substituting another chroming agent, such as chromium fluoride, for the chromium formate a like dyestuff is obtained.

Example 3.

44.4 parts of the sodium salt of the dyestuff from 4-nitro-2-diazo-1-phenol-6-sulfonic acid and aceto-acetic acid anilide corresponding probably with the formula:

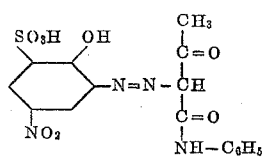

are dissolved in 1000 parts of water; a solution of chromium fluoride corresponding with 22.5 parts of $Cr_2O_3$ is then added and the whole heated for some time at the boiling temperature after addition of 10 parts of glass powder. The solution is then concentrated by partial evaporation and the new product precipitated by addition of common salt. It forms a brown powder, dissolving in water with yellow coloration and dyeing wool golden-yellow level tints of excellent properties of fastness. If, instead of chromium fluoride, other agents yielding chromium are employed such as for instance chromium formate, a dyestuff of analogous properties is obtained.

*Example 4.*

50 parts of the sulfonated product obtained by combining 2-diazo-4-nitro-1-phenol-6-carboxylic acid with the anthranilide of aceto-acetic acid are dissolved in 1000 parts of water and treated at the boil for several hours with 26 parts of chromium formate. The chromium compound is isolated by addition of common salt to the solution previously concentrated by evaporation. It forms a brown powder, dissolving in water with yellow coloration, and dyeing wool yellow tints; when printed on goods with chromium mordants, it yields pure and fast greenish-yellow tints.

The sulfonated dyestuff is obtained as follows: 20 parts of the finely powdered dyestuff are dissolved in a mixture of 50 parts of sulfuric acid monohydrate and 500 parts of fuming sulphuric acid (containing 25% of $SO_3$) and the mixture is mixed for some time at ordinary temperature. The whole is then poured on ice, the dyestuff is filtered, dissolved in water to which an alkali has been added, and precipitated from its solution rendered slightly alkaline by addition of acid by means of common salt. The new dyestuff forms an orange powder, dissolving in water to a yellow solution. Dyed directly or afterchromed it yields on wool yellow tints.

The arylide from aceto-acetic acid and anthranilic acid may be prepared as follows: 189 parts of anthranilic acid are dissolved in 2000 parts of benzene, 132 parts of aceto-acetic acid ethylester are then added at boiling temperature and the whole is heated further for some time. The solvent is then distilled off and the residue treated with hydrochloric acid of 10% strength which dissolves the anthranilic acid, whereas the anthranilide of the aceto-acetic acid remains undissolved forming a crystalline powder. Crystallized from hot water the new product melts at 150° C.

The following table shows the properties of some of the new chromium compounds:

| Derivative of acetoacetic acid | Diazotization component | Color of the dyestuff in a dry state | Color of the aqueous solution of the dyestuff | Tint obtained by dyeing of the dyestuff in an acid bath |
|---|---|---|---|---|
| Acetoacetic acid ethylester | 4-nitro-2-amino-1-phenol | Brownish-yellow powder | Yellow | Yellow |
| Acetoacetic acid anilide | 4-methyl-6-nitro-2-amino-1-phenol | Orange powder | Yellow | Yellow |
| " " " | 4, 6-dinitro-2-amino-1-phenol | Brown " | Brownish-yellow | Brown |
| " " " | Nitrated diazo derivative of 1-amino-2-naphthol-4-sulfonic acid | Brown " | Brown | Reddish-brown |
| Acetoacetic acid 2-chloro-anilide | 2-amino-1-phenol-6-nitro-4-sulfonic acid | Yellowish-brown powder | Orange-yellow | Orange-brown |
| Acetoacetic acid, 2,4-dichloro-anilide | 2-amino-1-phenol-4-chloro-6-sulfonic acid | Orange-brown " | Orange | Orange |
| Acetoacetic acid o-xylidide | Nitrated diazo derivative of 1-amino-2-naphthol-4-sulfonic acid | Brown " | Orange | Brown |
| Acetoacetic acid m-xylidide | " " " | Reddish-brown " | Reddish-brown | Reddish-brown |
| Sulfonated acetoacetic acid oanisidide | 4-nitro-2-amino-1-phenol | Orange " | Orange-yellow | Yellow |
| Sulfonated acetoacetic acid anthranilide | 4-nitro-2-amino-1-phenol-6-carboxylic acid and sulfonation of the azo dyestuff | Orange " | Yellow | Greenish-yellow |

What we claim is:

1. The herein described process for the manufacture of new dyestuffs by treating the dyestuffs corresponding most probably with the general formula

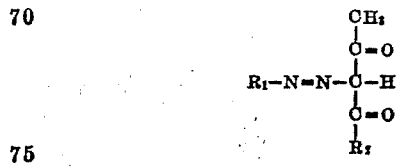

wherein $R_1$ stands for a nucleus of the benzene series carrying at least one nitro group and an OH group this latter being in ortho position to the azo-bridge, $R_2$ meaning O-alkyl or NH-aryl with agents yielding chromium.

2. The herein described process for the manufacture of new dyestuffs by treating the dyestuffs corresponding most probably with the general formula

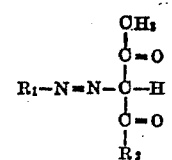

wherein $R_1$ stands for a nucleus of the benzene series carrying at least one nitro group and an OH group this latter being in ortho position to the azobridge, $R_2$ meaning NH-aryl, with agents yielding chromium.

3. The herein described new dyestuffs containing chromium which are compounds of the o-hydroxy dyestuffs corresponding most probably with the general formula:

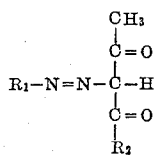

wherein $R_1$ stands for a nucleus of the benzene series carrying at least one nitro group and an OH group this latter being in ortho position to the azobridge, $R_2$ meaning O-alkyl or NH-aryl, which products form greenish-yellow to brownish-red and orange powders dissolving in water to yellow-orange and brown solutions and dyeing wool in an acid bath from yellow to orange and brown tints of excellent properties of fastness.

4. The herein described new dyestuffs containing chromium which are derivatives of the o-hydroxy dyestuffs corresponding most probably with the general formula:

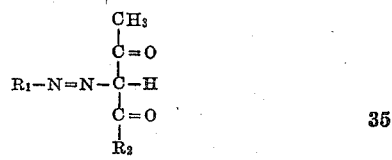

wherein $R_1$ stands for a nucleus of the benzene series carrying at least one nitro group and an OH group this latter being in ortho position to the azobridge, $R_2$ meaning NH-aryl, which products form greenish-yellow to brownish-red and orange powders dissolving in water to yellow-orange and brown solutions and dyeing wool in an acid bath from yellow to orange and brown tints of excellent properties of fastness.

5. Material dyed with the dyestuffs of claim 3.

6. Material dyed with the dyestuffs of claim 4.

In witness whereof we have hereunto signed our names this 20th day of May 1925.

FRITZ STRAUB.
GUILLAUME DE MONTMOLLIN.
JOSEPH SPIELER.
CHRISTOPH VON PLANTA.